J. J. ACKER.
SLACK ADJUSTER FOR BRAKES.
APPLICATION FILED MAY 23, 1910.
1,023,790.
Patented Apr. 23, 1912.
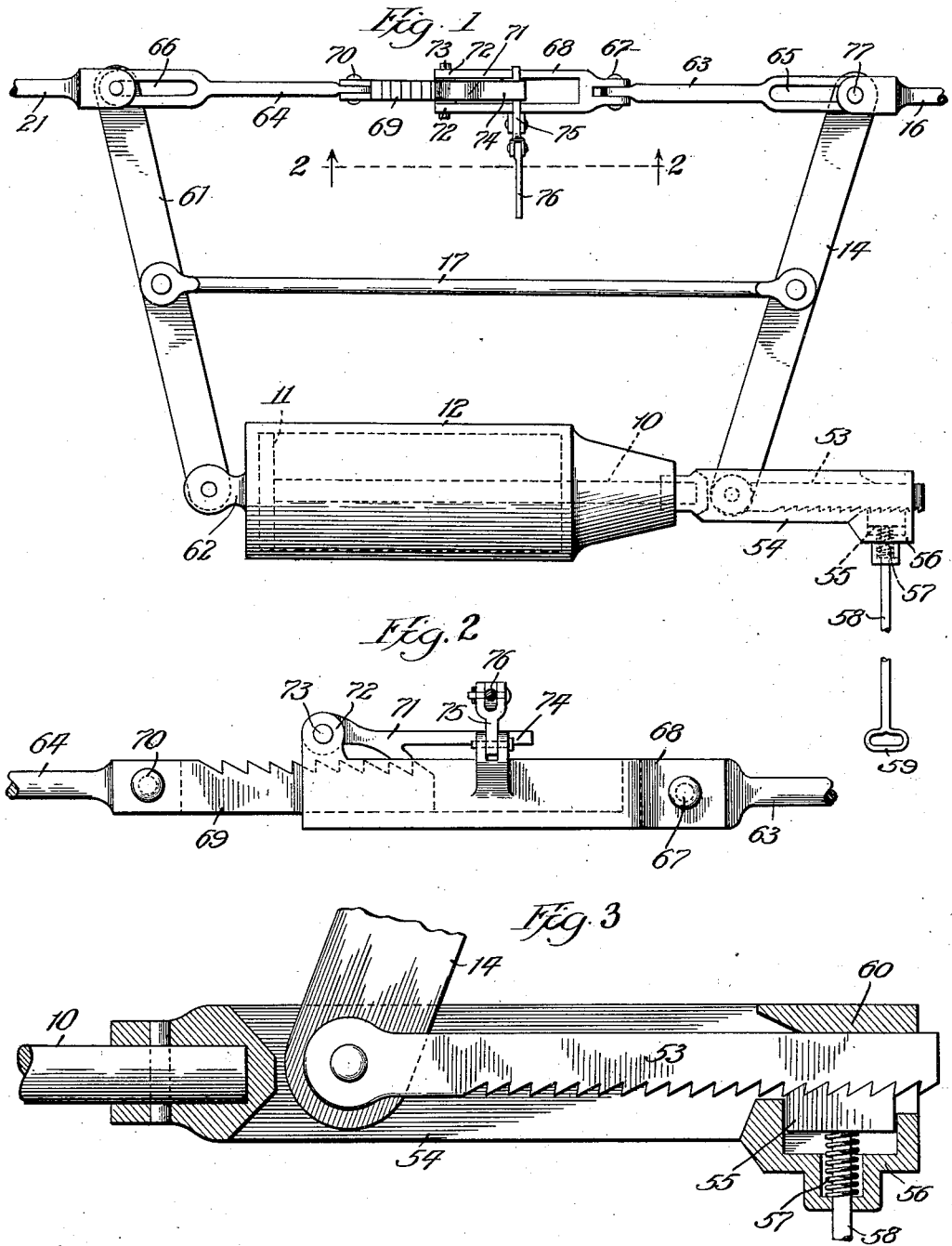

UNITED STATES PATENT OFFICE.

JULIUS J. ACKER, OF HORTON, KANSAS, ASSIGNOR OF FIFTY-ONE ONE-HUNDREDTHS TO WALTER P. MURPHY, OF CHICAGO, ILLINOIS, AND TWENTY-FOUR AND FIVE-TENTHS ONE-HUNDREDTHS TO CYRUS L. BUNDY, OF KINGSLAND, NEW JERSEY.

SLACK-ADJUSTER FOR BRAKES.

1,023,790. Specification of Letters Patent. Patented Apr. 23, 1912.

Application filed May 23, 1910. Serial No. 562,814.

*To all whom it may concern:*

Be it known that I, JULIUS J. ACKER, a citizen of the United States, and a resident of Horton, Brown county, Kansas, have invented certain new and useful Improvements in Slack-Adjusters for Brakes, of which the following is a specification.

My invention relates to slack adjusters for brakes and is particularly designed to automatically compensate for the wear on brake shoes as used in the ordinary and well known air brake systems.

In making an application of brakes, according to the system which is ordinarily employed, the push rod, controlled by the brake cylinder, is connected through suitable levers with the live lever rods which are, in turn, connected with the brake shoes. It is customary to allow a certain fixed amount of motion at the release of these live lever rods controlling the brake shoes, and it is the object of my invention to compensate for the wear on the brake shoes and thus keep this release motion constant.

I am aware that many types of slack adjusters have heretofore been used, but in my improvement, the parts are much simpler and less expensive than those which are ordinarily employed, the results at the same time being superior on account of the simplicity and unfailing action of the mechanism.

In my improvement, I provide a pair of ratchets with engaging dogs, the position of one of these ratchets being regulated by the degree of wear on the brake shoes and the other ratchet being controlled by the movement of the parts when the brakes are released.

These and other advantages of my invention will be more readily understood by reference to the accompanying drawings which show a preferred embodiment of my improvements and in which:

Figure 1 is a plan view of the various parts which are employed in connection with my slack adjuster. Fig. 2 is an enlarged fragmentary side elevation and partly sectional view on the line 2—2 of Fig. 1. Fig. 3 is an enlarged fragmentary plan view of the ratchet mechanism associated with the push rod.

The push rod 10 connected with the piston 11, operates within the brake cylinder 12 in the well known manner. The cylinder lever 14 is pivotally attached at its end to the ratchet 53 which is contained within a horizontal groove in the adjuster member 54 which is connected with the end of the push rod 10. Near the end of the adjuster member 54 is a dog 55 adapted to reciprocate within the casing 56 and controlled by the compression spring 57. Attached to the dog 55 is the release rod 58 terminating in the handle 59. The ratchet 53, when the dog 55 is released, can be reciprocated longitudinally within the slot in the adjuster member 54, being held from horizontal displacement by the vertical cross piece 60 on one of the adjuster members 54 and the dog casing 56. The hodge rod 17 serves to connect the cylinder lever 14 with the lever 61 which is pivotally connected at its end with the lug 62 on the end of the brake cylinder 12. The cylinder lever 14 and the lever 61 are pivotally connected at their free ends with the live lever rods 16 and 21, respectively. Associated with each of these pivotal connections with the live lever rods, are the adjusting rods 63 and 64, respectively, which have in their ends the slots 65 and 66. The adjuster rod 63 is pivotally connected by a pin 67 with the adjuster casing 68 which is in the form of a hollow box and within which the ratchet 69, pivotally attached to the adjusting rod 64 by the pin 70, is adapted to slide. As most clearly shown in Fig. 2, the retaining dog 71 is connected with the extensions 72, 72 on the adjuster casing 68 by means of the pin 73. The dog 71 has an extension 74 which can be raised by means of the bell-crank lever 75 to which is pivotally attached the releasing rod 76.

The operation of the slack adjuster which I have just described may now be readily understood. When the brakes are applied, the push rod 10 moves to the right thereby carrying the ratchet 53 to the right on account of the retaining action of the dog 55. At the same time the hodge rod 17 is moved a proportional distance to the right so that the ends of the cylinder lever 14 and the lever 61 will be moved a corresponding distance in the slots 65 and 66, respectively. As the push rod 10 continues to be moved to the right, the end of the cylinder lever 14 connected with the live lever rod 16 continues to be moved to the left until it strikes the left hand end of the slot 65. Meanwhile the hodge rod 17, as explained above, is actuated to move the end of the lever 61 connected to the live lever rod 21 to the right hand end of the slot 66. Now if there has been wear on the brake shoes associated with the live lever rod 16, this lever rod will be carried farther to the left and will thus force the adjuster casing 68 to the left, so that the dog 71 will engage a new tooth in the ratchet 69. Similarly if the brake shoes associated with the live lever rod 21 have become worn, the adjusting rod 64 will be moved to the right thereby correspondingly carrying the ratchet 69 to the right and similarly causing the dog 71 to engage a new tooth. Now, when it is desired to release the brakes, the push rod 10 is moved to the left thereby also carrying to the left the ratchet 53 and the end of the cylinder lever 14 connected therewith, until the pin 77 connecting the cylinder lever 14 and the live lever rod 16, reaches the right hand end of the slot 65. In this way further movement of the cylinder lever 14 is prevented and as the push rod 10 continues to move to the left, the dog 55 will ride over the teeth of the ratchet 53, engaging a new set of teeth.

When it is desired to replace worn-out brake shoes, the parts may be brought to full release position by releasing the dogs 71 and 55 by means of the release rods 76 and 58, respectively.

It will be apparent to those skilled in the art, that many detailed changes may be made in the exact construction which I have described without departing from the spirit of my invention.

What I claim is:

1. In combination, a push rod, means for actuating said push rod, a dog controlled ratchet movable in one direction with relation to said push rod, a cylinder lever pivotally connected with said ratchet, an adjusting rod having a slot therein, and with which said cylinder lever is connected, and a dog controlled ratchet for permitting movement of said adjusting rod in one direction only, the movement of the ratchet associated with the push rod by the cylinder lever compensating for the movement of the adjusting rod by said lever, substantially as described.

2. In combination, a push rod, means for actuating said push rod, a dog controlled ratchet movable in one direction with relation to said push rod, a cylinder lever pivotally connected with said ratchet, a live lever rod suitably connected with the brake shoes, means for pivotally connecting said live lever rod with said cylinder lever, an adjusting rod having a slot therein in which said connecting means is adapted to reciprocate, and a dog controlled ratchet limiting the movement of said cylinder lever and its associated live lever rod in one direction only, movement of said adjusting rod being compensated for by corresponding movement through said cylinder lever of the ratchet associated with said push rod, substantially as described.

3. In combination, a push rod, means for actuating said push rod, a dog controlled ratchet movable in one direction with relation to said push rod, a cylinder lever pivotally connected with said ratchet, a live lever rod suitably connected with the brake shoes, means for pivotally connecting said live lever rod with said cylinder lever, an adjusting rod having a slot therein in which said connecting means is adapted to reciprocate, and a dog controlled ratchet limiting the movement of said cylinder lever and its associated live lever rod in one direction only, movement of said adjusting rod being compensated for by corresponding movement through said cylinder lever of the ratchet associated with said push rod, and means for releasing the dogs associated with said ratchets in order to allow a full release of the brake shoes associated with said live lever rod, substantially as described.

JULIUS J. ACKER.

Witnesses:
A. J. RITZ,
C. W. MILLER.

---

Copies of this patent may be obtained for five cents each, by addressing the "Commissioner of Patents, Washington, D. C."